Aug. 4, 1953 M. CORDONE 2,647,766

INDEXED BOOK

Filed Jan. 8, 1948 4 Sheets-Sheet 1

INVENTOR.
Marcelin Cordone
BY
Haseltine, Lake & Co.
AGENTS

Aug. 4, 1953

M. CORDONE 2,647,766

INDEXED BOOK

Filed Jan. 8, 1948

4 Sheets-Sheet 2

INVENTOR.
Marcelin Cordone
BY
Haseltine, Lake & Co.
AGENTS.

Aug. 4, 1953 M. CORDONE 2,647,766

INDEXED BOOK

Filed Jan. 8, 1948 4 Sheets-Sheet 3

INVENTOR

MARCELIN CORDONE

BY Haseltine, Lake & Co.

AGENTS

Aug. 4, 1953 M. CORDONE 2,647,766

INDEXED BOOK

Filed Jan. 8, 1948 4 Sheets-Sheet 4

INVENTOR
MARCELIN CORDONE
BY Haseltine, Lake & Co.
AGENTS

Patented Aug. 4, 1953

2,647,766

UNITED STATES PATENT OFFICE 2,647,766

INDEXED BOOK

Marcelin Cordone, Lausanne, Switzerland

Application January 8, 1948, Serial No. 1,232
In Switzerland January 20, 1947

2 Claims. (Cl. 283—43)

Figure 1:
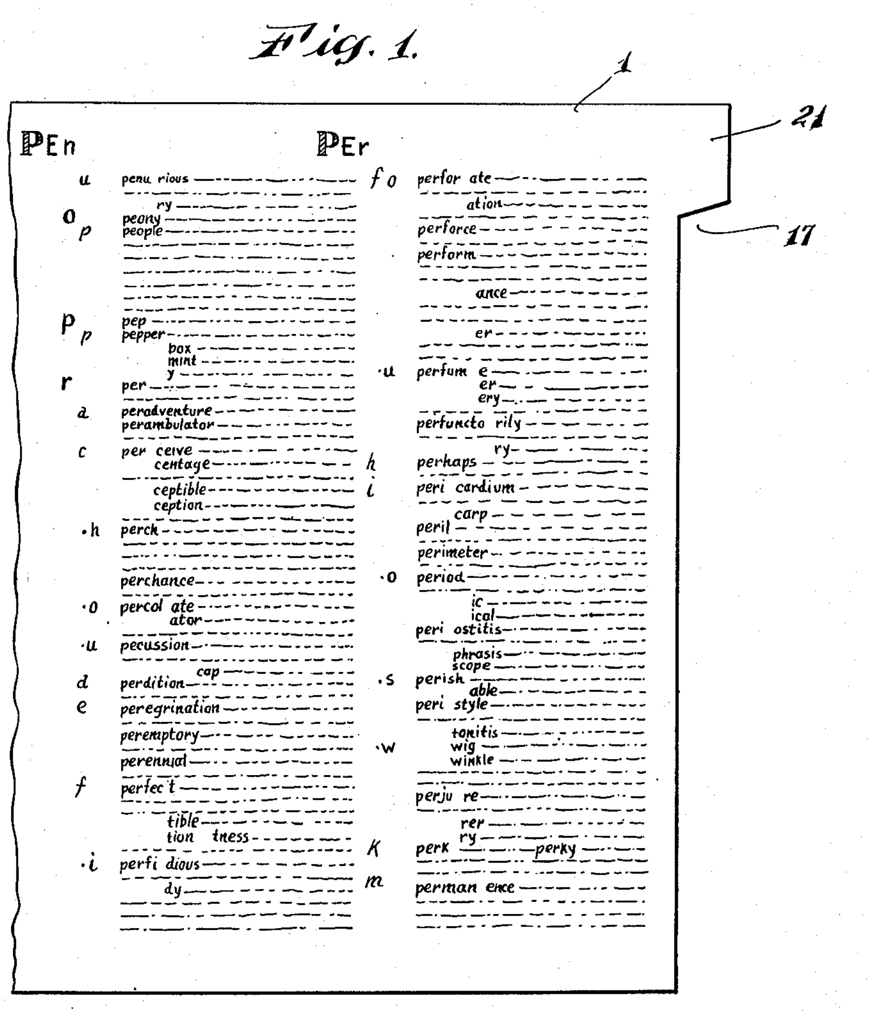

This invention relates to books containing classified matter in tabular form, such for example as dictionaries, numerical tables, catalogues and the like, and having marginal thumb indexes for facilitating location of individual items classified.

Though the provision of marginal tags, slots or notches must necessarily simplify such location, it is clearly impracticable to provide every page throughout a book with an individual tag, slot or notch and to dispose these consecutively in a single ladder since the index would be so crowded, and the references would be so small, that the index would be liable to defeat its own object. If, on the other hand, the index consists of a number of tags, slots or notches each bearing or disclosing a letter, figure or other legend which alone serves to identify all the items classified in a group or section of superimposed leaves, for example the letter "A" at the commencement of a group of leaves all bearing words commencing with that letter, the searcher, having opened the book at the page bearing the index "A", still has to turn over the individual leaves of that group in order to locate the particular item which he requires and which may be listed on any one of the pages of that group. Moreover, even when the page upon which the said item must be included has been found, successive items in the table have to be scanned in order finally to locate the item required. Thus, even when tags, notches or slots are provided for individual groups, the searcher is only helped by the index as far as the first page of the group, after which he has to spend considerable time and trouble first in locating the appropriate page, and then in tracing the required item thereon. In point of fact this method almost invariably results in the appropriate page first being passed, again missed on the return, and so on until location is finally effected more by elimination than by means of the index.

The present invention has for its object to provide an improved construction which will simplify location and at the same time afford an "open" index, that is to say in which the mutual spacing of the references, and the references themselves, are sufficiently large to permit ready recognition and selection.

A book containing classified matter in tabular form and according to the invention comprises a plurality of superimposed signatures each constituted by superimposed leaves having reference-bearing tabs or the like extending in terraced form substantially from an edge of the leaves in that signature, so as to form a thumb index which extends along said edges of successive signatures throughout the book.

Thus, in effect, each section has its own thumb index extending along a margin of the section and the index, whilst itemised to successive leaves, is yet sufficiently "open" to permit ready identification of any required item.

Preferably, each tab bears a reference or references which, alone or in conjunction with the reference or references on a previous tab, corresponds to an item at one end of a classified column on that or the preceding leaf. All the superimposed leaves of each section, with the possible exception of the last leaf of that section, may be cut away so as to provide the terraced tabs from, or adjacent to, the top of that section down to, or adjacent to, the bottom of that section, the last leaf of each section being conveniently stiffened or reinforced, for example by a marginal strip applied thereto.

The location of each section may be obtained by means of a tag projecting from a free edge of the book, the tags for locating successive sections being conveniently echeloned in the direction in which the columns are scanned.

In one arrangement, the leaves of each section are superimposed in mutual registration, but the sections are echeloned in a direction transverse to that in which the classified columns are scanned. In another arrangement, the leaves of each section are superimposed in mutual registration with the sections similarly superimposed.

References may be applied also adjacent to individual items in the body of each page. Each reference may comprise one or more letters or numerals each of which, by reason of its formation and/or position, inherently establishes the position in which that letter or numeral occurs in the classified item to which that letter or numeral refers.

It will be understood that the term "section" as herein employed is only intended to refer to a group of leaves whose number and arrangement during binding may correspond to what is commonly referred to as a "signature," or may be otherwise determined to suit requirements.

Figure 3:
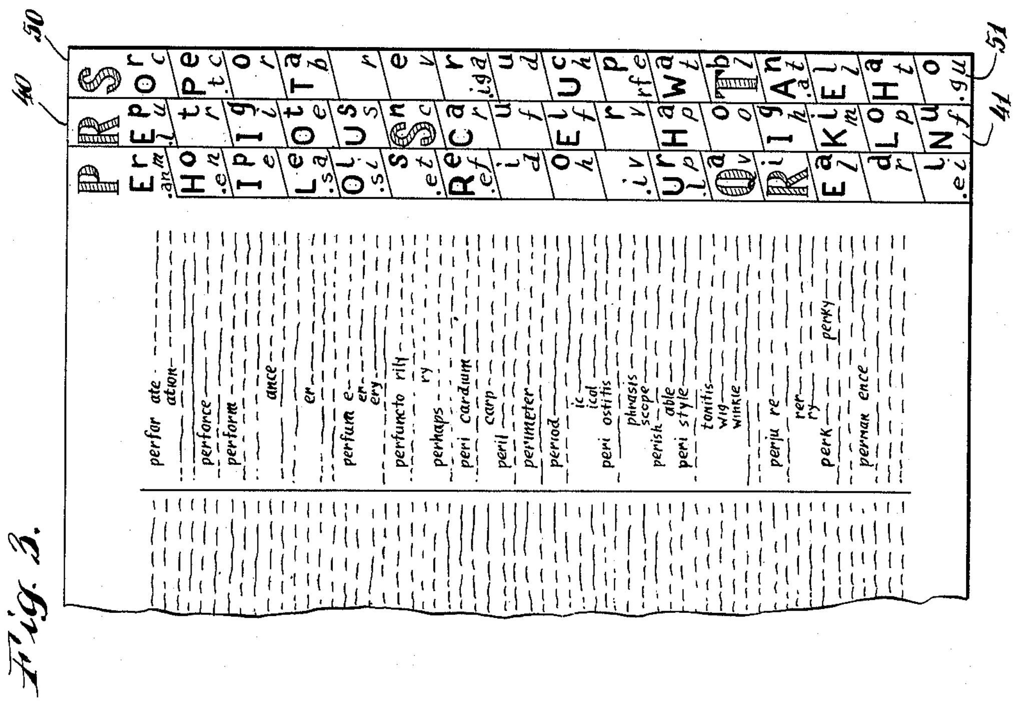
Figure 2:
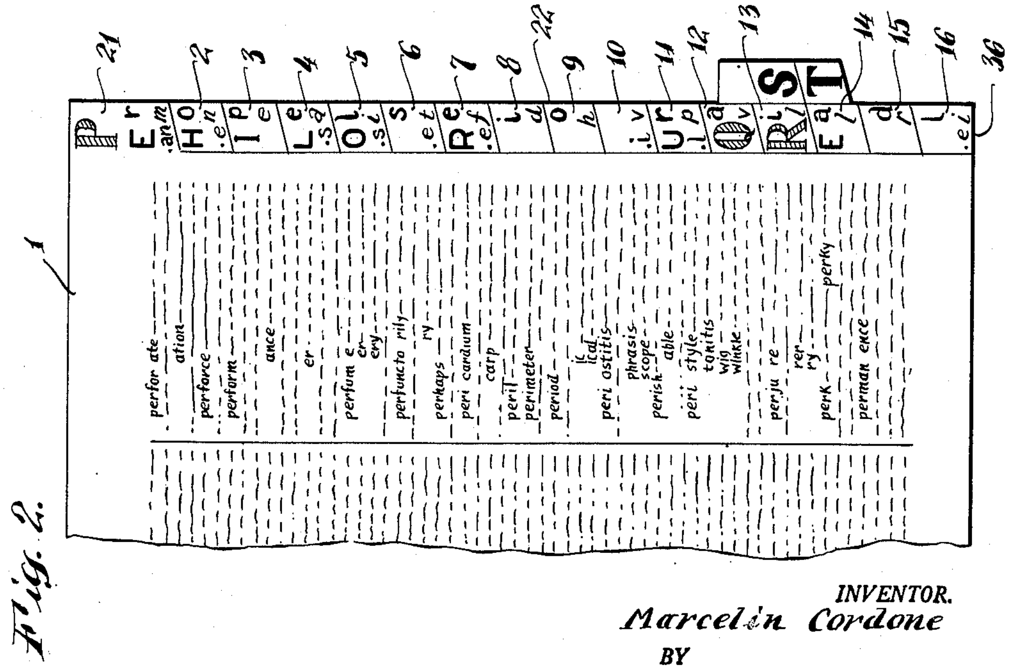
Figures 4, 7, 8:
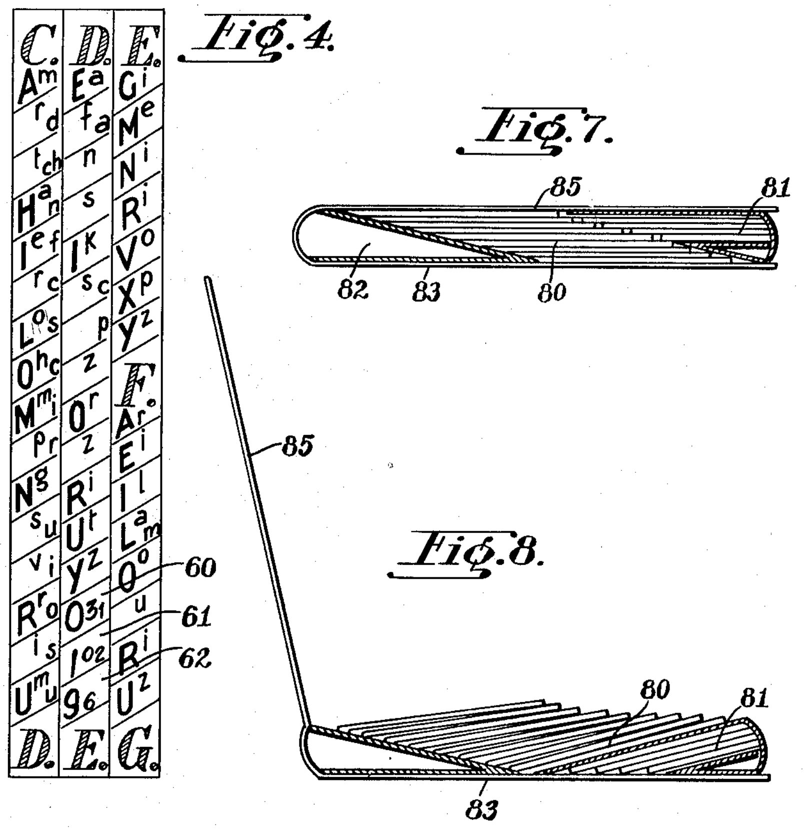
Figure 9:
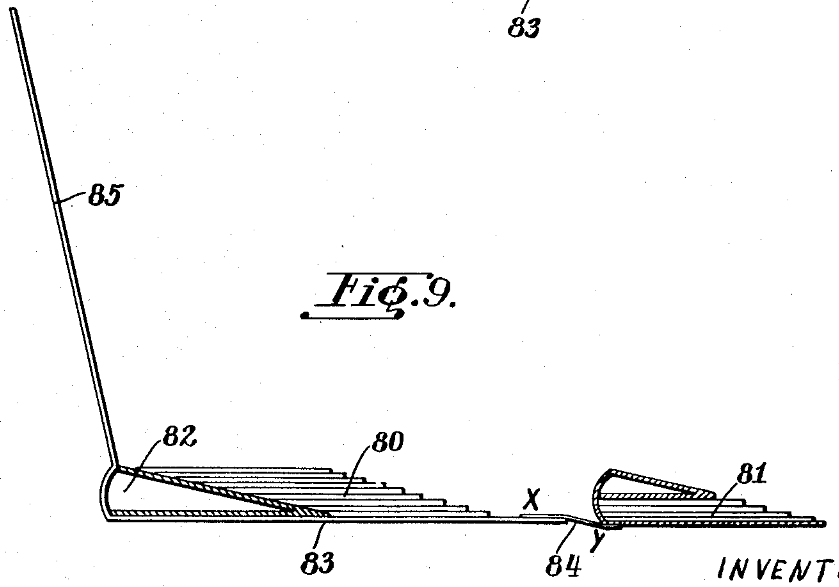
Figure 5:
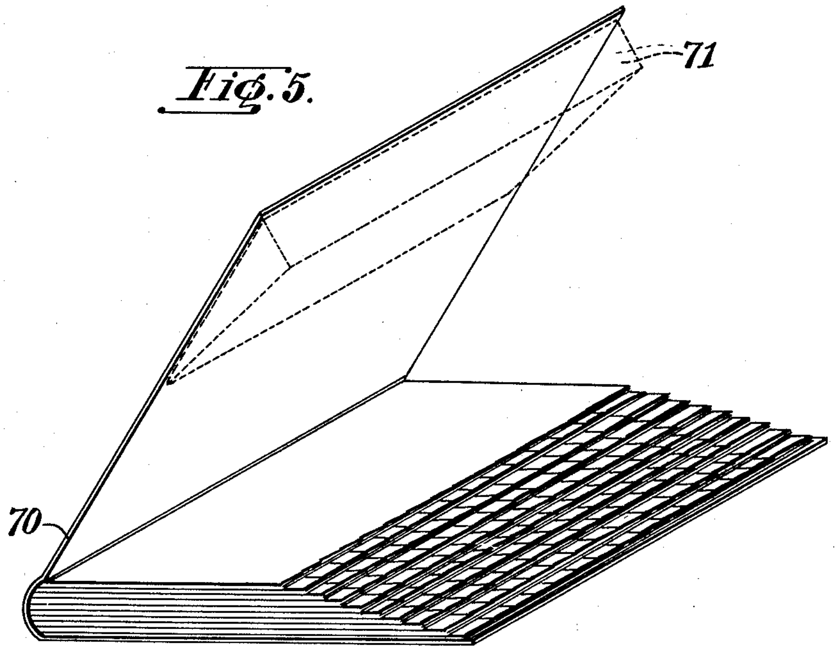
Figure 6:
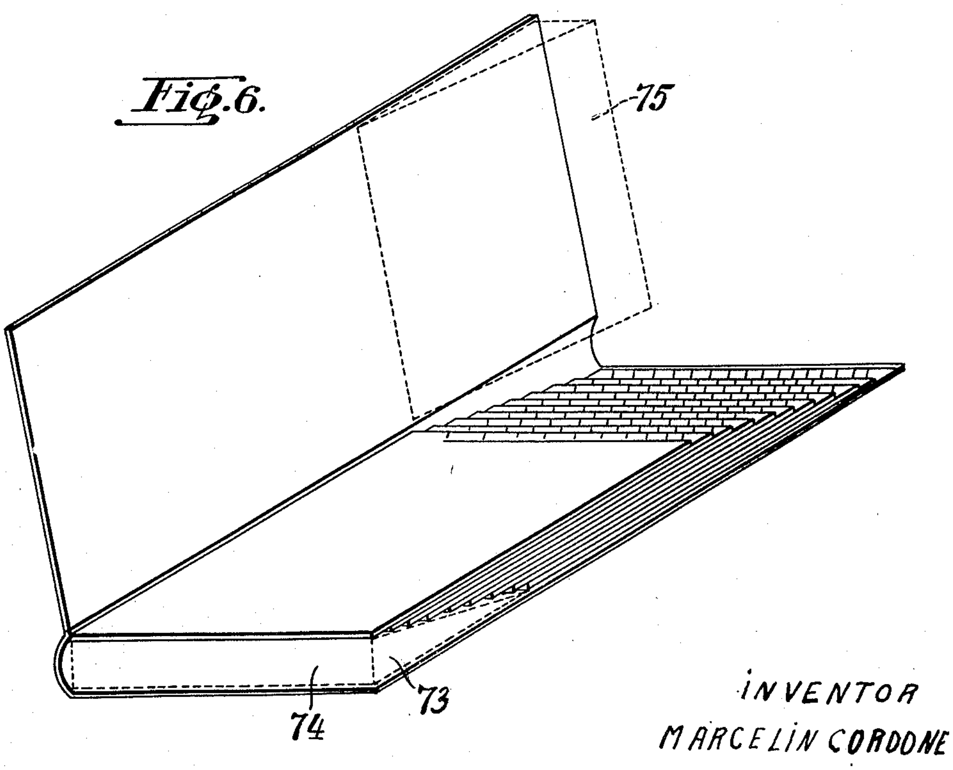

The invention may be carried into practice in various ways, but some convenient practical arrangements, each according to the invention, are shown by way of example as applied to a dictionary in the accompanying drawings, in which:

Figure 1 shows the major part of the first page of a section,

Figure 2 illustrates one construction wherein the several sections of the book are superimposed in mutual registration, the individual references in the body of the first page being omitted, Figure 3 shows a modified arrangement in which the leaves of each section are in mutual registration but the sections are echeloned transversely to the length of the classified columns, Figure 4 is a view similar to that of Figure 3 but with the thumb index somewhat modified, Figures 5 and 6 show respectively two complete books each having a thumb index arranged as shown in Figure 3 or Figure 4, and Figures 7, 8 and 9 illustrate another construction, the book being fully closed in Figure 7, open at its main part in Figure 8 and fully open in Figure 9.

In the construction shown in Figures 1 and 2, the first section in the part of the book included in Figure 2 comprises sixteen leaves which are indicated respectively by the numerals 1 to 16. This section may correspond to the not uncommon "signature" used in book binding, namely eight sheets folded centrally to provide sixteen leaves and thirty-two pages, the signature of nested sheets being sewn into the spine of the book. Each of the leaves 1 to 15 is cut away, for example, as shown at 17 in Figure 1, the length cut away decreasing in steps from the first page 1 to the penultimate page 15. In this way downwardly terraced tabs 21 to 35 are formed, all these tabs being simultaneously visible when the book is open at the first page of the section shown. The last leaf of this first section, namely the leaf 16 is not cut away and thus provides, in effect, the lowermost tab 36, the leaf 16 being stiffened along its edge by a reinforcing strip (not shown) pasted to the leaf parallel to its longitudinal edge.

Each section may include one or more initial letter groups of the dictionary, or may include only part of a letter group which is continued from the previous section and/or into the next succeeding section. In the example shown in Figure 2, the first section includes part of the word group having the initial letter P, the tab 21 bearing the letter P written in double-line capital form to indicate the first letters of the words on that page. In addition, however, the tab 21 carries the second, third, fourth, fifth and sixth letters of the last word listed in the adjacent classified column, that is to say the word "Permanence." It will be seen that the position in which each of these six letters occurs in the word "Permanence" is indicated both by the form and the position of each letter on the tab 21. The initial letter P is not only in double-line capital but is at the upper end of the tab and is disposed away from the righthand edge thereof, whilst the second letter E is in thick single-line capital and is disposed beneath the initial letter P. The third letter is written in thick lower case and to the right (and slightly above the level) of the second letter E. The fourth letter appears in thin italic to the right of and slightly below the level of the second letter E, whilst both the fifth and sixth letters are prefixed with a dot, so as to read ".an."

When searching for any word commencing with the letters "Per," the dictionary can be immediately opened at the leaf upon which the required word will appear either on the front of the leaf or on the back page of the previous leaf. For example, when searching for the word "Perfume," the dictionary is opened at the tab marked "Per" whereupon the references in the body of the page (Figure 1) which are inherently distinguished by reason of their positions and formations as described for the tab 21, are used to locate the required word by reading the reference "Per" at the top of the column, the letter "*f*" representing the fourth letter of the required word and then the "*.u*" representing the fifth letter of the word. Not only is turning of pages wholly eliminated, but none of the words in the column has to be read since the required word is located by the marginal references alone.

The second leaf of the first section shown in Figure 2 has its tab 22 marked with the letter "H" of second order, the letter "o" of third order, the letter "*n*" of fourth order and the letter ".e" of fifth order, so that the last word on the second leaf will be, say, "Phonetic." Similarly the last word on the front page of the third leaf will be, say, "Pipe" and so on until the leaf bearing the tab 31 completes, or nearly completes, the P group of words, for example with the last word "Purple." The leaf bearing the tab 32 commences the Q group of words whilst the next leaf bearing the tab 33 commences the R group of words which is continued on the first pages of the next section. The last page of each section is furnished with a tag such as those shown at S and T.

With the construction shown in Figures 1 and 2, all the leaves in each section, and all the sections, are stacked in mutual registration so that wherever the dictionary may be opened, only the index references of the exposed part of that section will be visible. Any word group can, however, be immediately located by means of the tags, such as S and T, all of which will be simultaneously visible.

Figure 3 shows a modified construction in which the indexes of all the sections are simultaneously visible. Thus, instead of the leaves 1 to 16 of the first section registering with the leaves of the subsequent sections, the sections are echeloned from left to right, that is to say transversely to the length of the tabulated columns. The first section is as described with reference to Figure 2 and the second section carries on the "Re" group of words, the last word on the first page 40 of the second section commencing with the letters "Repul." Similarly, the last word on the first page 50 of the third section commences with the letters "Sorc." As with the first section, the last leaves 41 and 51 of the second and third sections respectively are not cut away and are preferably stiffened by reinforcing strips. Tags projecting from the free edges of the leaves are not necessary with this arrangement since all the initial letters of the word groups are always visible.

Figure 4 is a modification of the arrangement shown in Figure 3, the last leaf, e. g. 16, of each section being cut away to expose the initial letter, e. g. D, of the next word group commencing with the first leaf of the next section. Here it will be seen that one whole section is allotted to each word group, any spare tabs, such for example as the tabs 60, 61 and 62, which may not be necessary due to the word group requiring only part of the section, being used for supplementary information indicated by a different system of references, e. g. the numerals shown. In the latter respect, the last number listed on the leaf bearing the tab 60 will commence with the digits "031," whose positions are indicated by the forms and positions of the numerals on the tab 60. Similarly, the last numbers listed on the leaves bearing the tabs 61 and 62 will commence with the digits "102" and "196" respectively.

It will be evident that instead of each tab reference representing the last word or numeral on the front page of that leaf, it may represent the first word or numeral of a tabulated column on that page or of the page on the back of that leaf. For example, instead of the tab 1 bearing the reference "Perman," it may bear the reference "Perfor" or "Penuri."

The book shown in Figure 5 is furnished with a thumb index as described with reference to Figure 3 or Figure 4. In this arrangement the sections are progressively increased in width from the first section to the last, thus providing the left-to-right echelon for disclosing the references. If desired, the top cover 70 of the book may be provided with a wedge-like part 71 formed of paste board and which, when the book is closed, fills the triangular space which would otherwise be left along one longitudinal edge. In Figure 6 all the sections of the book are of the same size but are mutually displaced longitudinally so as to provide the visible thumb index of Figure 3 or Figure 4 along a minor edge of the book. In this construction, the lower cover 73 may be provided with a wedge-like part 74 whilst the upper cover is provided with a wedge-like part 75, these two wedges filling the triangular spaces which would otherwise be formed at the two ends of the book respectively.

In Figures 7, 8 and 9, the book comprises a main part 80 and a supplementary part 81 each having its leaves echeloned to provide the thumb index described with reference to Figure 3 or Figure 4. The main part 80 is carried by a wedge-like part 82 secured to the bottom cover 83, whilst the supplementary part 81 is connected by a flexible hinge strip 84 to the cover 83. When the top cover 85 is closed, as in Figure 7, the terraced tabs of the two parts 80 and 81 fit together as shown, and when only the main part 80 is to be consulted the cover 85 is raised, as in Figure 8, whereby the whole index of the main part 80 is visible. If the supplementary part 81 is to be consulted, the main part 80 is raised and the supplementary part 81 is swung out, as in Figure 9.

It will be understood that the constructions described above are given by way of example only and that details may be modified to suit requirements. For example, the invention is applicable to books containing any classified matter in tabulated form whether verbal or numerical, or both verbal and numerical. Moreover, the thumb index may be arranged to appear along the left hand edge of the book instead of along the right hand edge, thus facilitating manipulation of the index with the left hand while the right hand is otherwise occupied, for example with a pen or telephone.

What I claim is:

1. A book containing classified matter in tabular form and comprising a plurality of superimposed group of leaves each constituted by superimposed leaves in mutual registration, the groups of leaves having all the same width and being echeloned in a direction away from a common support, at least all but the last one of the superimposed leaves of each group of leaves being cut away along an edge thereof, so as to provide a series of reference-bearing tabs extending in succession substantially from end to end of said edge of that group, the tabs extending in terraced form from said edge so as to form a thumb index which extends from end to end of said edge of successive groups of leaves throughout the book.

2. A book containing classified matter in tabular form and comprising a plurality of superimposed groups of leaves each constituted by superimposed leaves, the leaves of each group being superimposed in mutual registration, at least all but the last one of the superimposed leaves of each group being cut away along an edge thereof, so as to provide a series of reference-bearing tabs extending in succession substantially from end to end of said edge of that group, the tabs extending in terraced form from said edge so as to form a thumb index which extends from end to end of said edge of successive groups of leaves throughout the book, said groups of leaves being bound together along an edge other than said cut-away edge and each extending beyond the preceding group by an amount corresponding to the width of a tab.

MARCELIN CORDONE.

References Cited in the file of this patent

UNITED STATES PATENTS

| Number | Name | Date |
|---|---|---|
| 359,469 | Rand | Mar. 15, 1887 |
| 580,234 | Steinhardt | Apr. 6, 1897 |
| 1,012,429 | Pope | Dec. 19, 1911 |